April 7, 1931.   H. PHILLIPS ET AL   1,800,152
GROUND WORKING IMPLEMENT FOR CULTIVATORS
Filed July 15, 1930
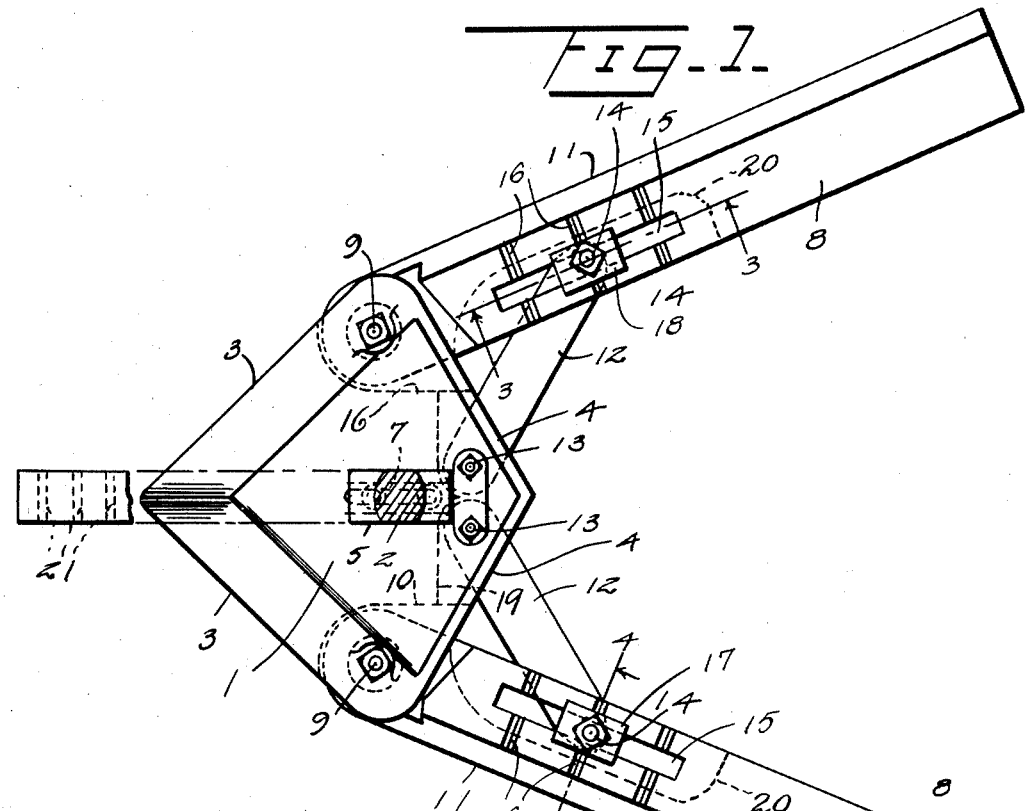
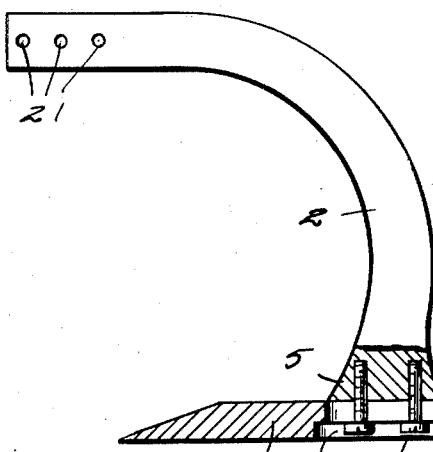
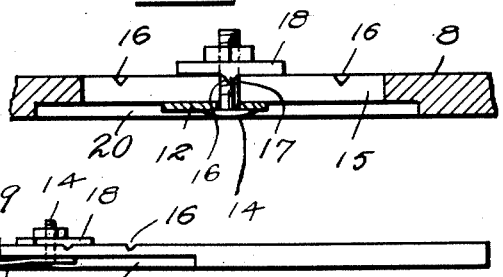
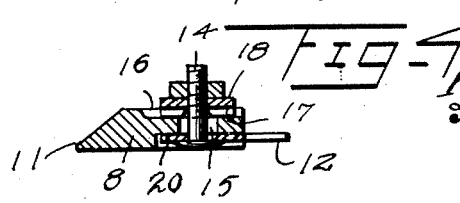
Inventor
Hugo Phillips
Katharine A. Phillips
By Watson E. Coleman
Attorney Patented Apr. 7, 1931

1,800,152

UNITED STATES PATENT OFFICE

HUGO PHILLIPS AND KATHARINE A. PHILLIPS, OF HYDESVILLE, CALIFORNIA

GROUND-WORKING IMPLEMENT FOR CULTIVATORS

Application filed July 15, 1930. Serial No. 468,082.

This invention relates to cultivators, and more particularly to a novel ground working implement for machines of this character.

The invention has for one of its objects to provide a device of the character stated which shall be adapted to thoroughly loosen the soil without throwing or banking it upon the stalks of the plants, which shall be adapted to loosen the soil in such manner as to leave the surface thereof smooth and thus adapt the soil to retain its moisture for a comparatively long period of time, and which shall be adjustable to adapt it for use between differently spaced rows of plants.

The invention has for a further object to provide a device of the character stated which shall be adapted to cut the weeds below the surface of the soil and which shall be adapted for use on tractor or horse drawn or hand cultivators.

The invention has for a further object to provide a device of the character stated which shall be simple and durable and capable of being manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawing, wherein:—

Figure 1 is a view partly in horizontal section and partly in top plan of a ground working implement constructed in accordance with our invention;

Figure 2 is a sectional view taken on a vertical plane extending centrally and longitudinally through the implement;

Figure 3 is a sectional view taken on the plane indicated by the line 3—3 of Figure 1, and Figure 4 is a sectional view taken on the plane indicated by the line 4—4 of Figure 1.

The ground working implement comprises a flat blade 1 which is of quadrilateral formation in plan and is secured to the lower end of a standard 2 with alined corners thereof arranged forwardly and rearwardly beyond the standard and with the other corners thereof arranged laterally beyond the standard. The formation of the blade 1, together with the arrangement thereof on the standard 2 provides it with rearwardly diverging front or advancing edges 3 and rearwardly converging rear or trailing edges 4, the front edges being sharpened. The standard 2 is provided with an elongated foot 5 which rests upon and extends forwardly and rearwardly of the blade 1. The blade 1 may be secured to the standard 2 by cap screws 6 passing through a slot 7 in the blade and engaging the standard foot 5. Any other suitable means may be employed to secure the blade 1 to the standard 2.

Wings 8 are pivotally connected at their front ends to the lateral corners of the blade 1, and this connection may be established by bolts 9 or the like. The blade 1 is provided in its under side in alinement with its lateral corners with recesses 10 which open out through said corners and through the rear edges of the blade, and the front ends of the wings 8 have their upper side portions cut away and arranged in the recesses, to the end that the lower surfaces of the blade and wings may be arranged in a common plane. The wings 8 extend in rearwardly divergent relation from the lateral corners of the blade 1, and their outer lateral edges 11 are sharpened. The wings 8 may be relatively adjusted to vary their angular relation, and their cutting edges 11 form continuations of the cutting edges 3 of the blade 1 in any adjustment thereof. The wings 8 may be adjusted to arrange their cutting edges 11 in alinement with the cutting edges 3 of the blade 1 or in any acute angular position with respect thereto.

The wings 8 are secured in adjusted position by braces 12 which are pivotally secured at their front ends, as at 13, to the rear corner of the blade 1, and which are provided at their rear ends with bolts 14 passing through slots 15 formed in and extending longitudinally of the wings. The wings 8 are provided in their upper surfaces and at opposite sides of the slots 15 with recesses 16 for the reception of ribs 17 on washers 18 mounted on the bolts 14, the engagement between the washers and wings positively holding the latter in adjusted position.

The braces 12 are located at the lower sides of the blade 1 and wings 8. The blade 1 is provided in its lower side with a recess 19 for the reception of the front ends of the braces 12, and the wings 8 are provided in their lower sides with recesses 20 for the reception of the rear ends of the braces, to the end that the lower sides of all these parts may occupy a common plane.

The standard 2 is provided with a series of openings 21 to permit it to be bolted to the frame of a cultivator of any type with the blade 1 and wings 8 set for deep or shallow cultivation. The blade 1 and wings 8 pass through and loosen the soil, and the blades cut the weeds below the surface of the soil. Due to their formations, the blade 1 and the wings 8 will not throw or bank the soil upon the stalks of the plant, and they will leave the surface of the soil smooth so that it will retain its moisture for a comparatively long period of time.

While we have described the principle of the invention, together with the structure which we now consider the preferred embodiment thereof, it is to be understood that the structure shown is merely illustrative and that such changes may be made, when desired, as fall within the scope of the invention as claimed.

We claim:—

1. A ground working implement for a cultivator, comprising a standard, a flat blade secured to the lower end of the standard and having rearwardly diverging advancing cutting edges and having rearwardly converging trailing edges, wings extending rearwardly from the blade and pivoted at their front ends to the blade at the rear ends of the cutting edges of the blade, the wings being provided with longitudinal slots and provided in their upper sides and at opposite sides of the slots with recesses, braces pivoted to the blade, bolts secured to the braces and passing through the slots of the wings, and washers mounted upon the bolts and provided with ribs engaging in certain recesses of the wings.

2. A ground working implement for a cultivator, comprising a standard, a flat blade secured to the lower end of the standard and having rearwardly diverging advancing cutting edges and having rearwardly converging trailing edges, wings extending rearwardly from the blade and pivoted at their front ends to the blade at the rear ends of the cutting edges of the blade, the wings being provided with longitudinal slots and provided in their upper sides and at opposite sides of the slots with recesses, braces pivoted to the blade, bolts secured to the braces and passing through the slots of the wings, washers mounted upon the bolts and provided with ribs engaging in certain recesses of the wings, the blade being provided in its under side with recesses and the front ends of the wings being reduced and fitting in the recesses, and the blade being provided with a recess for the reception of the front ends of the braces and the wings with recesses for the reception of the rear ends of the braces to arrange the lower surfaces of these parts in a common plane.

In testimony whereof we hereunto affix our signatures.

HUGO PHILLIPS.
KATHARINE A. PHILLIPS.